W. Ripley.
Drafting Plotters.
Nº 22,585.  Patented Jan. 11, 1859.
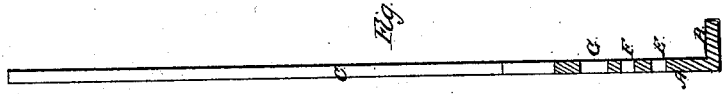
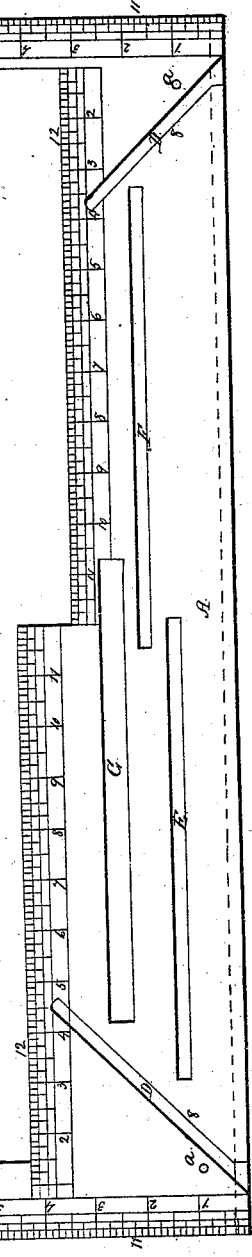

UNITED STATES PATENT OFFICE.

WILLIAM RIPLEY, OF EDGARTOWN, MASSACHUSETTS.

FRAMING-SQUARE.

Specification of Letters Patent No. 22,585, dated January 11, 1859.

*To all whom it may concern:*

Be it known that I, WILLIAM RIPLEY, of Edgartown, Dukes county, in the State of Massachusetts, have invented an Improved Framing-Square; and I do hereby declare that the same is fully described and represented in the following specification and the accompanying drawings, of which—

Figure 1 is a top view of said square; Fig. 2, a transverse section of it; Fig. 3, an edge view taken so as to show the graduating of the bearing ledge or lip, to be hereinafter described.

In carrying out my invention, I make use of a long and wide ruler, A, provided with a bearing lip or ledge, B, extending down at right angles to the plane of the ruler and from its rear edge as shown in the drawings. From each end of the square I extend at a right angle to the bearing lip B a squaring arm C, and I make through the rule A, and at an angle of 45° to the bearing ledge and each squaring arm two straight slots D, D, which I term the bevel slots. They are arranged so as to run in opposite directions, that is so that were they continued they would cross one another at right angles. I also make other slots E, F, G, through the ruler A, and parallel to the bearing ledge B, as shown in Fig. 1. The slot E, is placed at one inch from the said bearing ledge, and it may be a quarter of an inch in width. The slot, F, I make a quarter of an inch in width, and arrange it at a distance of one and a half inches from the bearing ledge. So with regard to the slot, G, I make such one half an inch in width and arrange it a distance of two inches from the bearing ledge. These latter slots, viz., E, F, and G, I term mortising slots, their purpose being to enable a person by means of a pencil or marking instrument to lay off on timber the boundaries of mortises of different widths, the same being accomplished by laying the square flatwise on the stick of timber, pressing the bearing ledge close up to the vertical edge of the timber and with a pencil marking against those edges of the parallel slots which are at a distance apart equal to the width of the mortise required, the rule A being arranged so that the marks shall be parallel and where wanted on the stick. By the aid of the squarings arms, the cross marks indicative of the length of the mortises may be made. By means of the ruler, mortises of various widths and shoulders and tenons to correspond with them may be set off or marked out, as will be easily understood by joiners. In order to facilitate setting off the lengths of the mortises, as well as for other purposes, for which the instrument may be used, the edges of the instrument may be graduated or marked in feet and inches and subdivisions thereof as represented in the drawing. By means of the beveled slots, the squaring arms, and the bearing ledge, the tenons of the inclined braces or roof timbers can be marked off on the timber.

In Fig. 1, I have represented the manner of marking out tenons. The line, 8, indicates the shoulders of the tenons which being marked out across the joist the square is to be placed up on it and the side of the timber so as to enable a person to mark off lines, 11, and, 12, denoting the heel and lower edge of the tenons.

In Fig. 1, I have represented at *a, a,* holes made through the base rule A, and in proper positions to indicate the centers of the pin holes of the brace tenon, when the framing square is applied to such tenon, so that the bearing ledge and squaring rule may be arranged respectively on the shoulder and heel of the tenon. Under these circumstances, if a pointed instrument be forced down through the hole *a*, which may be directly over the tenon, it will indicate the place where the pin hole is to be bored.

The peculiar arrangement of the bevel slots, viz, in reverse of one another with respect to the bearing ledge and the two squaring arms is advantageous in several respects, as it enables a person to mark out the brace tenons on opposite ends of the stick or joist and greatly facilitates the operation of doing so.

I do not claim the mere repetition of the bevel or miter slots and squaring arms as applied to the rule A, provided with a lip B, but What I do claim is—

The improved manufacture of framing square, as made with its bearing ledge, its squaring arms, miter slots and mortising slots, arranged together and with respect to a base rule A, substantially as hereinbefore set forth.

In witness whereof I have hitherto subscribed my name the 14th day of Feb. eighteen hundred and fifty-six

WILLIAM RIPLEY. [L. S.]

In presence of—
JOSEPH T. PEASE,
JOSEPH HOLLEY.